United States Patent
Lee et al.

(10) Patent No.: US 11,140,528 B2
(45) Date of Patent: Oct. 5, 2021

(54) METHOD FOR DECODING V2X SIGNAL TRANSMITTED BY MEANS OF TRANSMIT DIVERSITY METHOD IN WIRELESS COMMUNICATION SYSTEM, AND TERMINAL USING SAME

(71) Applicant: LG ELECTRONICS INC., Seoul (KR)

(72) Inventors: Seungmin Lee, Seoul (KR); Hanbyul Seo, Seoul (KR); Youngtae Kim, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 192 days.

(21) Appl. No.: 16/495,822

(22) PCT Filed: Mar. 21, 2018

(86) PCT No.: PCT/KR2018/003254
§ 371 (c)(1),
(2) Date: Sep. 19, 2019

(87) PCT Pub. No.: WO2018/174537
PCT Pub. Date: Sep. 27, 2018

(65) Prior Publication Data
US 2020/0037126 A1   Jan. 30, 2020

Related U.S. Application Data

(60) Provisional application No. 62/474,088, filed on Mar. 21, 2017.

(51) Int. Cl.
*H04W 4/40*         (2018.01)
*H04L 1/00*         (2006.01)
(Continued)

(52) U.S. Cl.
CPC ............. *H04W 4/40* (2018.02); *H04L 1/0061* (2013.01); *H04L 1/06* (2013.01); *H04L 5/0048* (2013.01);
(Continued)

(58) Field of Classification Search
CPC ... H04B 7/02; H04B 7/06; H04B 7/08; H04B 17/364; H04L 1/00; H04L 1/0001;
(Continued)

(56) References Cited

U.S. PATENT DOCUMENTS 10,383,147 B2 *   8/2019   Rajagopal ......... H04W 28/0284
10,925,035 B2 *   2/2021   Kim .................... H04L 27/26
(Continued)

FOREIGN PATENT DOCUMENTS

CN       106413117       2/2017
WO       2016117968      7/2016

OTHER PUBLICATIONS

European Patent Office Application Serial No. 18771401.9, Search Report dated Feb. 12, 2020, 7 pages.
(Continued)

*Primary Examiner* — Thomas R Cairns
(74) *Attorney, Agent, or Firm* — Lee, Hong, Degerman, Kang & Waimey

(57) ABSTRACT

Provided are a method for decoding a V2X signal transmitted by means of a transmit diversity method in a wireless communication system, and a terminal for applying same. The method comprises: determining a first CS index of a first DM-RS associated with a first antenna port on the basis of a CRC of sidelink control information (SCI) received via a PSCCH; determining a second CS index of a second DM-RS associated with a second antenna port on the basis of reserved bits of the SCI; and on the basis of the first DM-RS having the first CS index applied thereto, and the second
(Continued)

DM-RS having the second CS index applied thereto, decoding a V2X signal transmitted via the first antenna port and the second antenna port.

12 Claims, 15 Drawing Sheets

(51) Int. Cl.
  *H04L 1/06* (2006.01)
  *H04L 5/00* (2006.01)
  *H04L 27/26* (2006.01)
  *H04W 72/04* (2009.01)
  *H04W 88/16* (2009.01)

(52) U.S. Cl.
  CPC ...... *H04L 27/2605* (2013.01); *H04L 27/2649* (2013.01); *H04W 72/0406* (2013.01); *H04W 72/0446* (2013.01); *H04W 88/16* (2013.01)

(58) Field of Classification Search
  CPC ... H04L 1/0057; H04L 1/0059; H04L 1/0061; H04L 1/0063; H04L 1/02; H04L 1/06; H04L 1/0606–0693; H04L 1/08; H04L 5/0048; H04L 5/005–0051; H04L 5/0053; H04L 5/0055–0057; H04L 12/66; H04L 25/0212; H04L 25/03242; H04L 27/2602–26035; H04L 27/2605; H04L 27/2607; H04L 27/2611; H04L 27/2649; H04L 27/265–26546; H04L 27/2665; H04M 13/00; H04W 4/40; H04W 4/42–48; H04W 8/20; H04W 36/0072; H04W 72/0406; H04W 72/0413–0433; H04W 72/0446; H04W 88/16; H04W 92/02
  See application file for complete search history.

(56) References Cited

U.S. PATENT DOCUMENTS

2017/0019887 A1    1/2017  Jiang et al.
2017/0171690 A1*   6/2017  Kim ..................... H04L 51/02

OTHER PUBLICATIONS

Intel, "PSSCH DMRS generation for sidelink V2V communication", 3GPP TSG RAN WG1 Meeting #87, R1-1611919, Nov. 2016, 3 pages.
Intel, "Proposal to align DMRS cyclic shift for PSCCH and PSSCH (Correction to V2V CR-36.211)", 3GPP TSG RAN WG1 Meeting #86bis, R1-1609453, Oct. 2016, 3 pages.
Intel, "Transmit diversity for NR physical downlink control channel", 3GPP TSG RAN WG1 Meeting #88, R1-1702218, Feb. 2017, 5 pages.
PCT International Application No. PCT/KR2018/003254, International Search Report dated Jun. 14, 2018, 4 pages.
Samsung, "Further randomization on DMRS and scrambling code," 3GPP TSG-RAN WG1 #88, R1-1702861, Feb. 2017, 4 pages.
Qualcomm Incorporated, "Random sequence initialization correction for DMRS," 3GPP TSG-RAN WG1 #88, R1-1702522, Feb. 2017, 5 pages.
LG Electronics, "Remaining issues for PC5 V2V," 3GPP TSG-RAN WG1 #88, R1-1702394, Feb. 2017, 8 pages.
Intel Corporation, "On PSSCH DMRS Signal Generation and Performance Analysis," 3GPP TSG-RAN WG1 #88, R1-1702138, Feb. 2017, 7 pages.
The State Intellectual Property Office of the People's Republic of China Application Serial No. 201880020316.3, Notice of Allowance dated Aug. 16, 2021, 4 pages.

* cited by examiner

METHOD FOR DECODING V2X SIGNAL TRANSMITTED BY MEANS OF TRANSMIT DIVERSITY METHOD IN WIRELESS COMMUNICATION SYSTEM, AND TERMINAL USING SAME

CROSS-REFERENCE TO RELATED APPLICATIONS

This application is the National Stage filing under 35 U.S.C. 371 of International Application No. PCT/KR2018/003254, filed on Mar. 21, 2018, which claims the benefit of U.S. Provisional Application No. 62/474,088, filed on Mar. 21, 2017, the contents of which are all hereby incorporated by reference herein in their entirety.

BACKGROUND

Field of the Disclosure

The present disclosure relates to wireless communication and, more specifically, to a method for decoding a vehicle-to-everything (V2X) signal transmitted by means of a transmit diversity method in a wireless communication system and a UE using the same.

Related Art

Recently, interest in device-to-device (D2D) that is direct communication between devices has increased. Particularly, D2D attracts attention as a communication technology for public safety networks. Public safety networks have higher service requirements (reliability and security) than commercial communication networks and, particularly, require direct signal transmission and reception between devices, that is, D2D operation even when coverage of cellular communication is not reached or unavailable.

D2D operation has various advantages in terms of signal transmission and reception between neighboring devices. For example, a D2D UE can perform data communication with a high transfer rate and a low delay. Further, D2D operation can distribute traffic concentrated on a base station, and if a D2D UE serves as a relay, the D2D UE can also serve to extend the coverage of the base station.

Meanwhile, in Long Term Evolution-Advanced (LTE-A), an interface between UEs is referred to as a sidelink and a sidelink can also be used for communication between UEs installed in vehicles or between a UE installed in a vehicle and another UE, that is, vehicle-to-everything (V2X).

Meanwhile, conventional V2X communication does not support transmit diversity. Transmit diversity includes various methods such as space diversity which transmits signals using two or more spatially separated antennas, frequency diversity which transmits signals using different frequency resources, and time diversity which transmits signals using different time resources.

A legacy UE operating according to standards that do not support transmit diversity for V2X communication and an enhanced UE operating according to new standards that support transmit diversity for V2X communication may coexist. In this case, a method and an apparatus for transmitting a V2X signal to which transmit diversity has been applied to the enhanced UE while minimizing the influence on the legacy UE or allowing the enhanced UE to decode the V2X signal are needed.

SUMMARY

An object of the present disclosure is to provide a method for decoding a V2X signal transmitted by means of a transmit diversity method and a UE using the same.

In one aspect, provided is a method for decoding a V2X signal transmitted by means of a transmit diversity method in a wireless communication system. The method includes determining a first cyclic shift (CS) value of a first demodulation reference signal (DM-RS) associated with a first antenna port on the basis of a cyclic redundancy check (CRC) of sidelink control information (SCI) received through a physical sidelink control channel (PSCCH), determining a second CS value of a second DM-RS associated with a second antenna port on the basis of reserved bits of the SCI and decoding the V2X signal transmitted through the first antenna port and the second antenna port on the basis of the first DM-RS to which the first CS value has been applied and the second DM-RS to which the second CS value has been applied.

The first DM-RS may be determined on the basis of the first CS value and the second DM-RS is determined on the basis of the second CS value.

The reserved bits of the SCI may include an offset value with respect to a CS, and the second CS value is determined by applying the offset value with respect to the CS to the first CS value.

The first antenna port may be an antenna port commonly used for legacy UEs and advanced UEs, and the second antenna port is an antenna port used only for the advanced UEs.

The V2X signal may be received in two consecutive symbols in a subframe including a plurality of symbols in the time domain.

The last symbol of the subframe may be not used to receive the V2X signal.

The first CS value and the second CS value may be indexes indicating cyclic shift values.

The V2X signal may be received in units of two symbols from among symbols other than symbols used to receive a reference signal in a subframe including a plurality of symbols.

When the subframe includes 14 symbols, the units of two symbols may include second and fourth symbols, fifth and seventh symbols, eighth and tenth symbols, and eleventh and thirteenth symbol.

When the subframe includes 14 symbols, the units of two symbols may include fourth and fifth symbols, seventh and eighth symbols, tenth and eleventh symbol.

When the subframe includes 14 symbols, the symbols used to receive a reference signal may be third, sixth, ninth and twelfth symbols.

In another aspect, provided is a user equipment (UE). The UE includes a transceiver configured to transmit and receive radio frequency (RF) signals and a processor operating in connection with the transceiver. The processor is configured to determine a first cyclic shift (CS) value of a first demodulation reference signal (DM-RS) associated with a first antenna port on the basis of a cyclic redundancy check (CRC) of sidelink control information (SCI) received through a physical sidelink control channel (PSCCH), to determine a second CS value of a second DM-RS associated with a second antenna port on the basis of reserved bits of the SCI and to decode the V2X signal transmitted through the first antenna port and the second antenna port on the basis of the first DM-RS to which the first CS value has been applied and the second DM-RS to which the second CS value has been applied.

According to the present disclosure, in a situation in which a legacy UE operating according to standards that do not support transmit diversity for V2X communication and an enhanced UE operating according to new standards that support transmit diversity for V2X communication may coexist, it is possible to transmit a V2X signal using a transmit diversity method to the enhanced UE while minimizing the influence on the legacy UE and the enhanced UE can decode the V2X signal. Particularly, it is possible to efficiently announce cyclic shift values used to determine reference signals used to decode the V2X signal.

DESCRIPTION OF EXEMPLARY EMBODIMENTS

Figure 1:
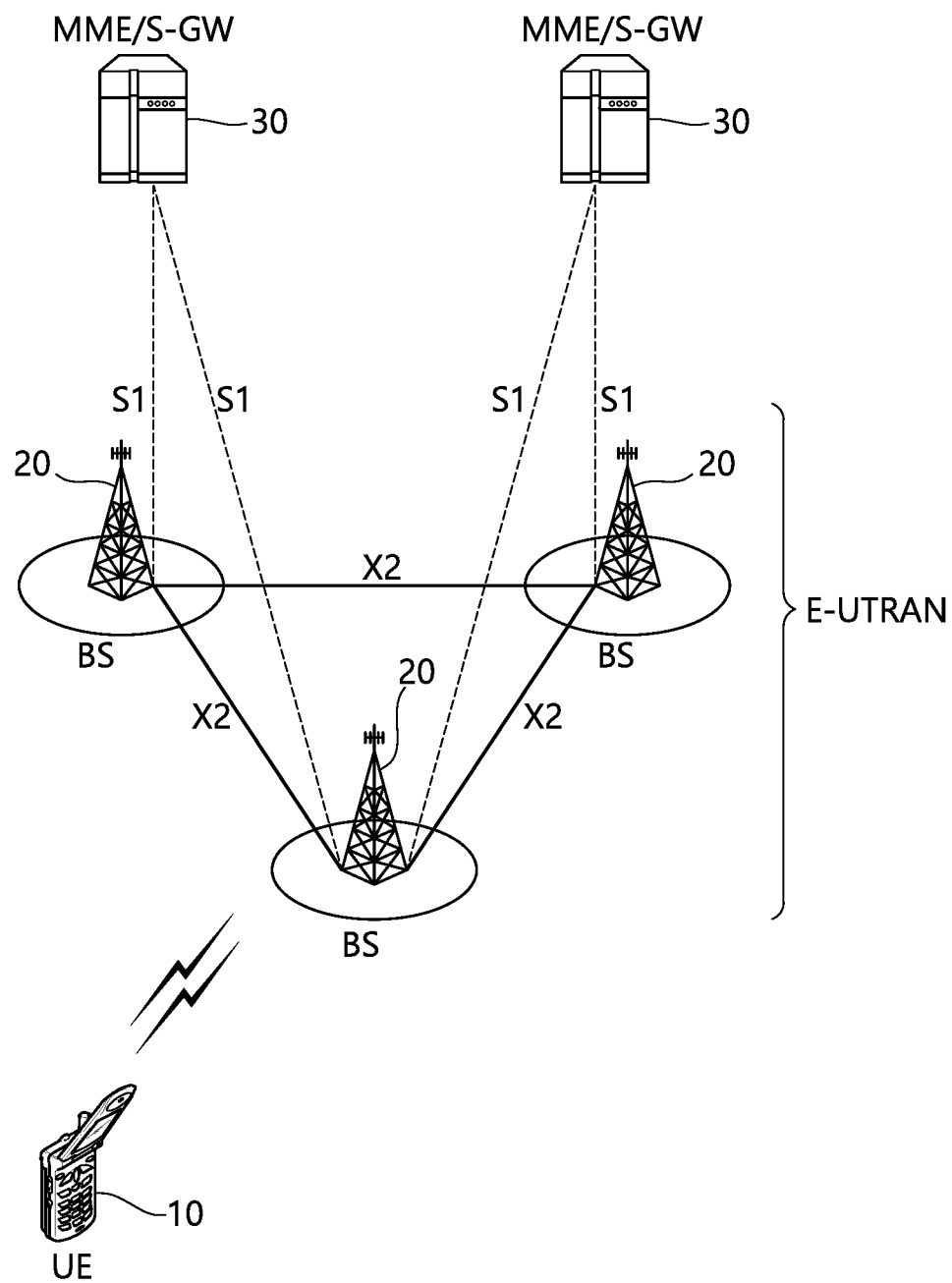
FIG. 1 illustrates a wireless communication system.

FIG. 1 shows a wireless communication system.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

The wireless communication system may be a time division duplex (TDD) system, a frequency division duplex (FDD) system, or a system in which TDD and FDD are used together.

Figure 2:
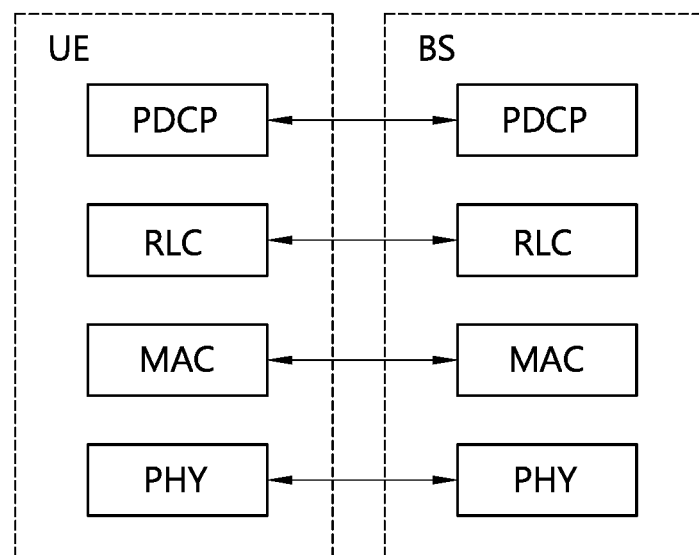
FIG. 2 is a block diagram showing the structure of a radio protocol on the user plane.
Figure 3:
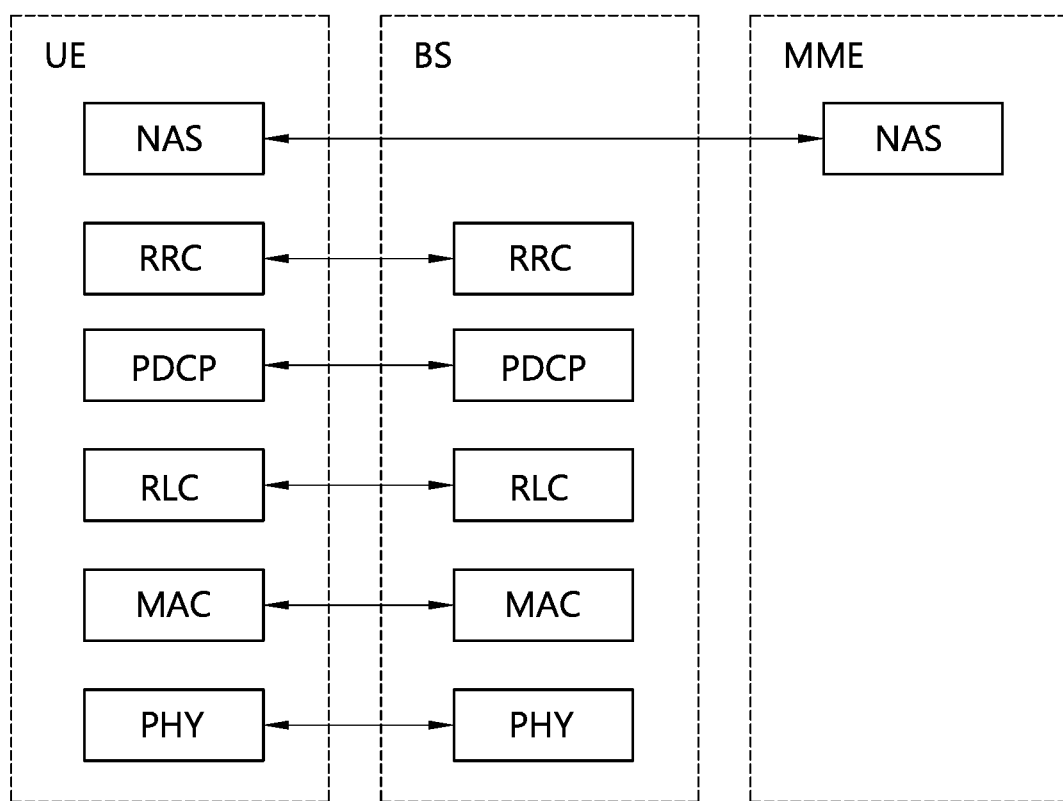
FIG. 3 is a block diagram showing the structure of a radio protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

An RRC state refers to whether an RRC layer of a UE is logically connected to an RRC layer of E-UTRAN, a state in which they are connected to each other is referred to as an RRC connected state RRC_CONNECTED, and a state in which they are not connected to each other is referred to as an RRC idle state RRC_IDLE. A UE in an RRC connected state has RRC connection and thus E-UTRAN can detect presence of the UE per cell and can effectively control the UE. On the other hand, a UE in an RRC idle state cannot be detected by E-UTRAN and is managed by a core network (CN) per tracking area that is a larger area unit than a cell. That is, only presence or absence of a UE in an RRC idle state is detected per large area and the UE needs to switch to an RRC connected state in order to receive mobile communication services such as audio and data services.

When a user initially powers on a UE, the UE searches for an appropriate cell first and then remains in the cell in an RRC idle state. The UE in the RRC idle state establishes RRC connection with E-UTRAN through an RRC connection procedure and switches to an RRC connected state when RRC connection needs to be established. Cases in which a UE in an RRC idle state needs to establish RRC connection include, for example, a case in which uplink data transmission is required due to a user's attempt to call, a case in which, when a paging message is received from E-UTRAN, a response message to the paging message is transmitted, and the like.

A non-access stratum (NAS) layer higher than the RRC layer executes functions such as session management and mobility management.

To manage UE mobility in the NAS layer, two states of EMM-REGISTERED (EPS Mobility Management-REGISTERED) and EMM-DEREGISTERED are defined and these two states are applied to a UE and an MME. The UE is initially in the EMM-DEREGISTERED state and performs a procedure of registering with a network through an initial attach procedure to access the network. When the attach procedure has been successfully performed, the UE and the MME become the EMM-REGISTERED state.

To manage signaling connection between a UE and an EPC, two states of ECM (EPS Connection Management)-IDLE and ECM-CONNECTED are defined and these two states are applied to the UE and MME. When an UE in an ECM-IDLE state establishes RRC connection with E-UTRAN, the UE switches to an ECM-CONNECTED state. An MME in an ECM-IDLE state switches to an ECM-CONNECTED state when the MME establishes S1 connection with E-UTRAN. When the UE is in the ECM-IDLE state, E-UTRAN does not have context information of the UE. Accordingly, the UE in the ECM-IDLE state performs a UE based mobility related procedure such as cell selection or cell reselection without the need to receive a command from a network. On the other hand, when the UE is in the ECM-CONNECTED state, mobility of the UE is managed by a command from the network. When the position of the UE changes to a position different from that known to the network in the ECM-IDLE state, the UE notifies the network of the corresponding position through a tracking area update procedure.

Hereinafter, D2D operation will be described. In 3GPP LTE-A, services related to D2D operation are called proximity based services (ProSe). Hereinafter, ProSe is the concept equivalent to D2D operation and can be interchangeably used with D2D operation. Hereinafter, ProSe will be described.

ProSe includes ProSe direct communication and ProSe direct discovery. ProSe direct communication refers to communication performed between two or more neighboring UEs. The UEs can perform communication using a user plane protocol. A ProSe-enabled UE refers to a UE supporting procedures related to ProSe requirements. The ProSe-enabled UE include both a public safety UE and a non-public safety UE unless otherwise mentioned. The public safety UE is a UE that supports both functions specialized for public safety and a ProSe process and the non-public safety UE is a UE that supports the ProSe process but does not support the functions specialized for public safety.

ProSe direct discovery is a process for discovering a ProSe-enabled UE. Here, only capability of the aforementioned two ProSe-enabled UEs. EPC-level ProSe discovery refers to a process in which an EPC determines whether two ProSe-enabled UEs are in proximity to each other and notify the two ProSe-enabled UEs of the proximity thereof.

Hereinafter, ProSe direct communication may be referred to as D2D communication and ProSe direct discovery may be referred to as D2D discovery. A link used for D2D operation is referred to as a sidelink in LTE.

Now, V2X communication is described. V2X refers to communication between a UE installed in a vehicle and another UE. The other UE may be a pedestrian, a vehicle, or infrastructure. In this case, V2X may be respectively referred to as V2P (vehicle to pedestrian), V2V (vehicle to vehicle) and V2I (vehicle to infrastructure).

V2X communication can transmit and receive data/control information through a sidelink defined in D2D operation instead of uplink/downlink between a base station and a UE used in LTE.

The following physical channels can be defined for the sidelink.

PSBCH is a physical sidelink broadcast channel PSCCH is a physical sidelink control channel PSDCH is a physical sidelink discovery channel. PSSCH is a physical sidelink shared channel. SLSS is a sidelink synchronization signal. SLSS may include a PSSS (Primary Sidelink Synchronization Signal) and an SSSS (Secondary Sidelink Synchronization Signal). The SLSS and the PSBCH can be transmitted together.

The sidelink can refer to an interface between UEs and can correspond to PC5 interface.

Figure 4:
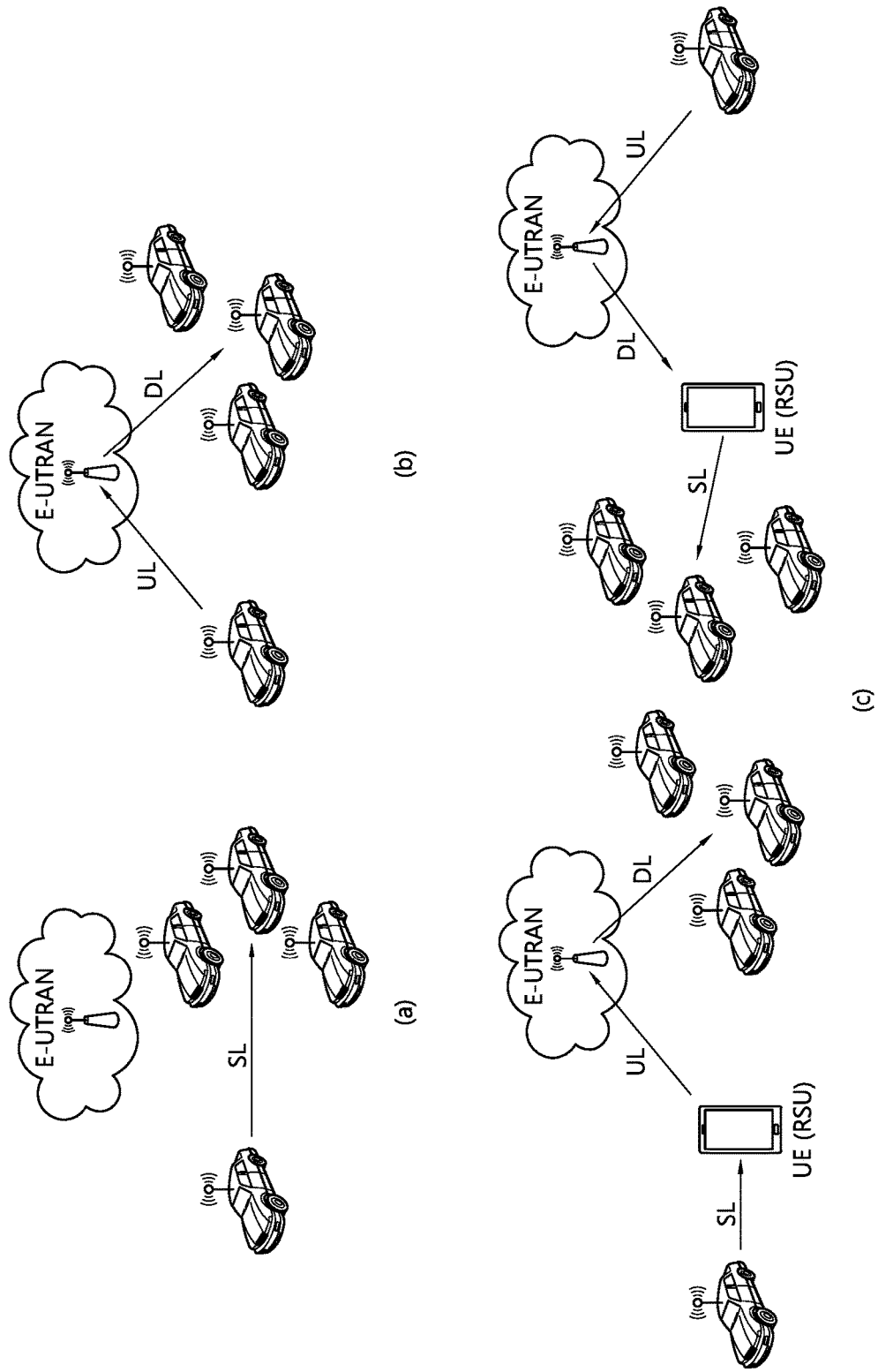
FIG. 4 illustrates scenarios for V2X communication.

FIG. 4 illustrates scenarios for V2X communication.

Referring to FIG. 4(a), V2X communication can support information exchange (between UEs) based on PC5 that is an interface between UEs and may support information exchange (between UEs) based on Uu that is an interface between an eNodeB and a UE, as illustrated in FIG. 4(b). Further, V2X communication may support information exchange (between UEs) using both PC5 and Uu as illustrated in FIG. 4(c).

Hereinafter, the present disclosure will be described on the basis of 3GPP LTE/LTE-A for convenience of description. However, the present disclosure can be extended and applied systems other than 3GPP LTE/LTE-A.

Now, the present disclosure is described.

The present disclosure relates to a method for efficiently managing a V2X message transmission operation based on transmit diversity (TXD) in a preset or signaled V2X resource pool, and a reception method of a UE which receives the V2X message.

In the present disclosure, "TXD" can be interpreted as a transmission operation based on a plurality of preset or signaled antenna ports (APs), for example, SFBC (space frequency block coding), STBC (space time block coding), precoding cycling(/random beamforming) for each AP(/symbol), or the like.

Figure 5:
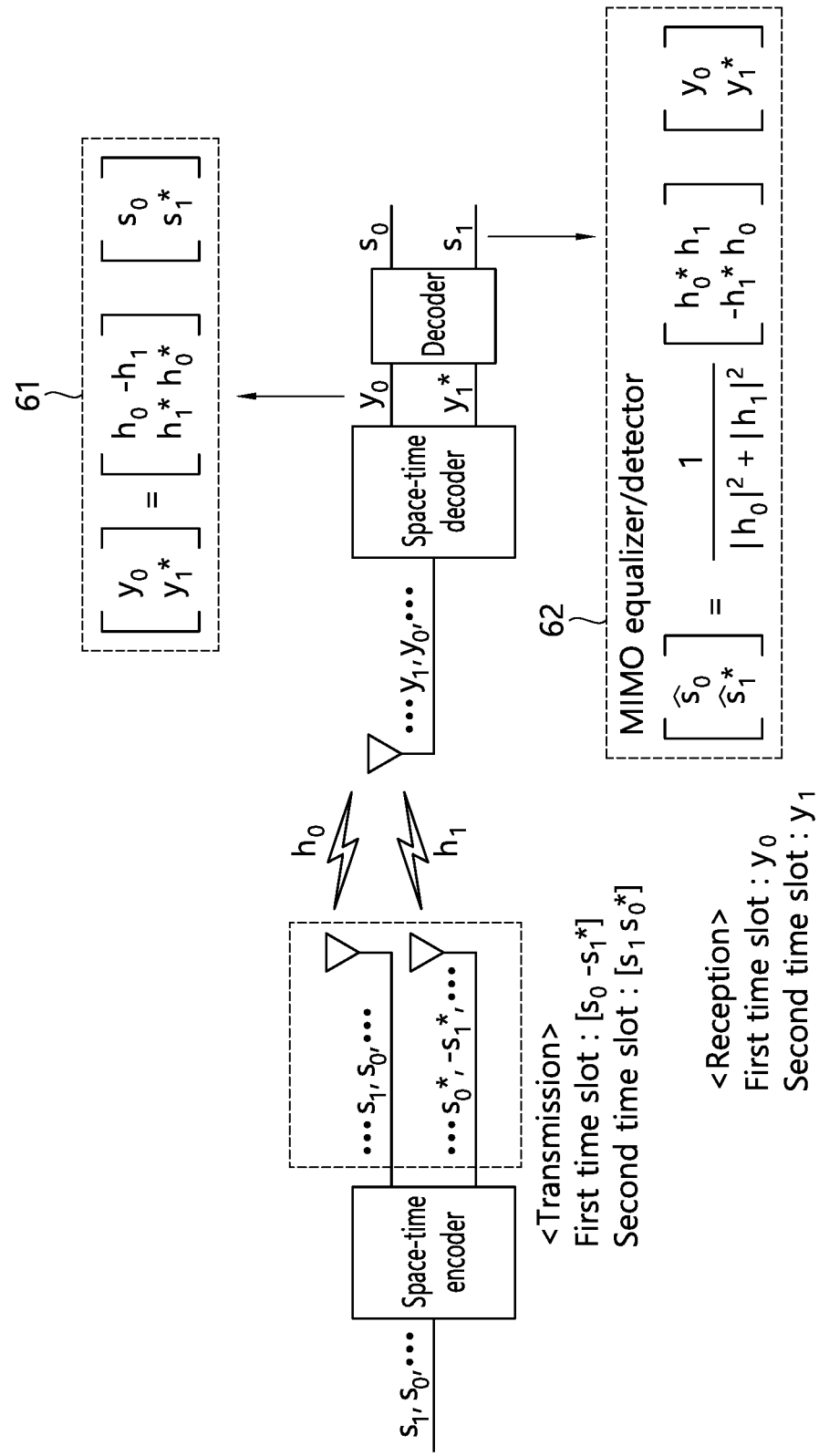
FIG. 5 illustrates an example of STBC.

FIG. 5 illustrates an example of STBC.

Referring to FIG. 5, a transmitter transmits signals $s_0$ and $s_1$ using two antennas (antenna ports). Specifically, the transmitter can transmit $s_0$ using the first antenna (antenna port) and simultaneously transmit $-s_1^*$ using the second antenna (antenna port) at the first time (e.g., first symbol). Here, * represents a complex conjugate. A receiver receives corresponding data $y_0$.

Then, the transmitter transmits $s_1$ using the first antenna (antenna port) and transmits $s_0^*$ using the second antenna (antenna port) at the second time (e.g., second symbol). The receiver receives corresponding data $y_1$.

In such a case, $y_0$ and $y_1$ are in a relationship with $s_0$ and $s_1$, represented by Equation 1 (61) of FIG. 5. If the receiver already know channel information $h_0$ and $h_1$, the receiver can ascertain $s_0$ and $s_1$ using Equation 2 (62) of FIG. 5.

Meanwhile, when TXD operation based on a plurality of antenna ports (APs) is performed, power distribution between different APs can be performed according to at least one of (A) a method of uniformly distributing power to the APs (all the time) and (B) a method of distributing power depending on a power distribution ratio (between APs).

Hereinafter, the method proposed by the present disclosure can be extended and applied to a case in which a UE (referred to as TXD_UE) which performs TXD based V2X message transmission operation and a UE (referred to as LEG_UE) other than the TXD_UE share a V2X resource pool. LEG_UE may be, for example, a UE which performs transmission operation based on a single AP (and/or a less number of APs than that for TXD_UE). LEG_UE may be interpreted as a legacy UE (UE operating according to LTE REL-14) which performs single AP based transmission operation and/or sensing operation.

In the present disclosure, "TXD" may be extended and interpreted as transmission operation using a plurality of antenna ports. Further, methods proposed by the present disclosure can be extended and applied to cases in which UEs which perform transmission operation based on different numbers of antenna ports share a V2X resource pool.

In the present disclosure, "sensing operation" can be interpreted as PSSCH-RSRP measurement operation based on a demodulation reference signal (DM-RS) sequence in a PSSCH scheduled by a successfully decoded PSCCH and/or S-RSSI measurement operation based on a V2X resource pool related subchannel.

S-RSSI (Sidelink Received Signal Strength Indicator), S-RSRP (Sidelink Reference Signal Received Power), CBR (Channel busy ratio) and CR (Channel occupancy ratio) will be described.

First, S-RSSI is a received signal strength indicator on sidelink. S-RSSI can be defined as a linear average of total received power for each SC-FDMA symbol, observed by a UE in a set subchannel, in SC-FDMA symbols #1, 2, . . . , 6 of the first slot of a subframe and SC-FDMA symbols #0, 1, . . . , 5 of the second slot.

S-RSRP refers to reference signal receive power on sidelink. S-RSRP may include, for example, PSSCH-RSRP for which RSRP is calculated in PSSCH. PSSCH-RSRP can be defined as a linear average of power contributions of resource elements (REs) carrying a DM-RS related to the PSSCH in a physical resource block (PRB) indicated by the related PSSCH.

CBR represents a channel busy ratio and CBR measured in subframe n can be defined as follows.

In the case of a PSSCH, CBR is sensed in subframes [n−100, n+1] and represents a ratio in a resource pool of a subchannel having S-RSSI measured to exceed a predetermined or set threshold value.

In the case of a PSCCH, CBR is sensed in subframes [n+100, n+1] and represents a ratio of resources of a PSCCH pool having S-RSSI measured to exceed a predetermined or set threshold value in a pool set such that the PSCCH is transmitted along with the corresponding PSSCH in resources blocks which are not consecutive. Here, it is assumed that the PSCCH pool is composed of resources having a size of two consecutive PRB pairs in the frequency domain.

CR refers to a channel occupancy rate. CR calculated in subframe n can be defined as a value obtained by dividing the sum of the number of subchannels used for transmission thereof in subframes [n−a, n+1] and the number of subchannels permitted for transmission thereof in subframes [n, n+b] by the number of subchannels configured in a transmission pool over subframes [n+a, n+b].

Here, a is a positive integer and b is 0 or a positive integer. a and b are determined by a UE, a+b+1=1000, a is equal to or greater than 500, and n+b needs not to exceed the latest transmission opportunity of a grant for current transmission. Cr can be evaluated for each (re)transmission.

Figure 6:
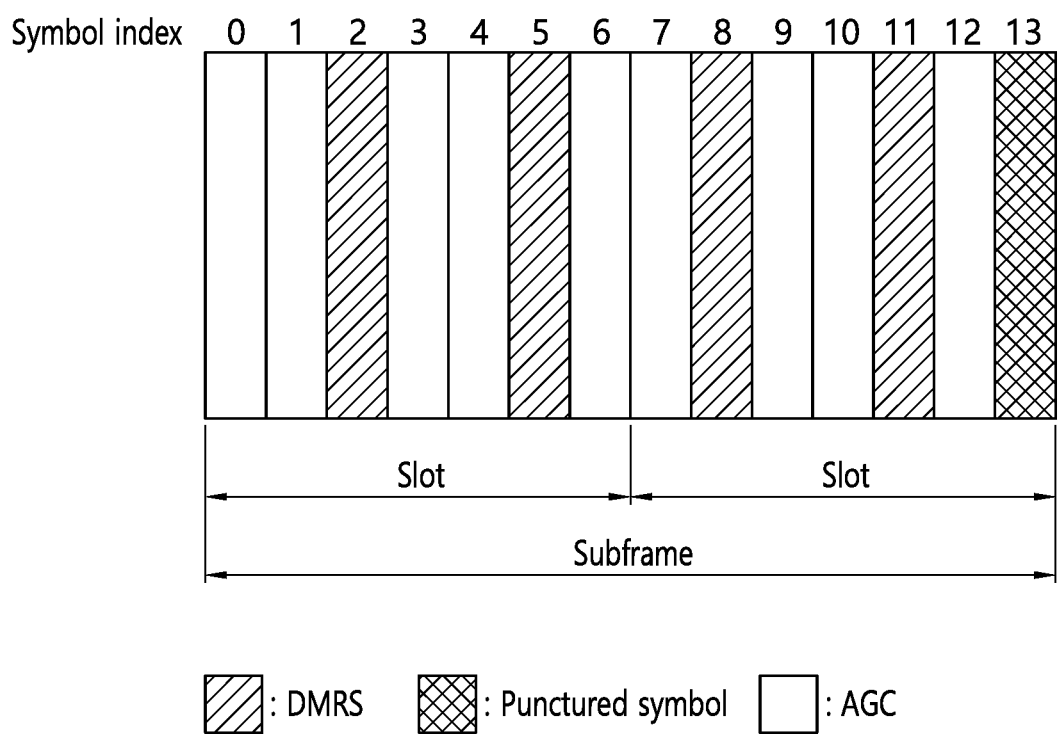
FIG. 6 illustrates conventional channel and subframe structures used for V2X message transmission/reception.

FIG. 6 illustrates conventional channel and subframe structures used for V2X message transmission/reception.

Referring to FIG. 6, the first symbol SYMBOL#0 in a subframe used for V2X message transmission/reception can be used (e.g., punctured) for "automatic gain control (AGC)" (in a receiving end) and the last symbol SYMBOL#13 can be punctured for "transmission-reception switching" (in a transmitting end) in normal CP. That is, there may be exceptional restriction on the initial symbol and the last symbol of a subframe in terms of data transmission in V2X communication.

The present disclosure proposes efficient (TXD related) symbol pairing in consideration of the aforementioned exceptional restriction. That is, two symbols may be necessary when TXD is applied, as described in FIG. 5, and the present disclosure proposes a method of determining the two symbols. The method below may be restrictively applied to only TXD operation based on "STBC" (and/or "precoding/beam cycling). Further, the present disclosure also proposes a method of transmitting a V2X signal in paired symbols and symbols that are not paired.

[Proposed method] The following (some) rules can be applied in order to maximize TXD gain and efficiently support(/operate) the same.

(Rule #1) To effectively obtain TXD gain in a receiving end, symbol paring can be set(/signaled) according to the rule below. Here, "symbol pairing" can be interpreted as at least one of (A) a symbol (group) unit to which the same precoding (beam) set that has been set(/signaled) in advance is (cyclically) applied, (B) a symbol (group) unit in which transmission based on a preset(/signaled) number of same APs (sets) is performed, and (C) a symbol (group) unit in which a preset(/signaled) number of "paired modulation symbols" are (repeatedly) transmitted, with respect to TXD.

Example #1-1

Figure 7:
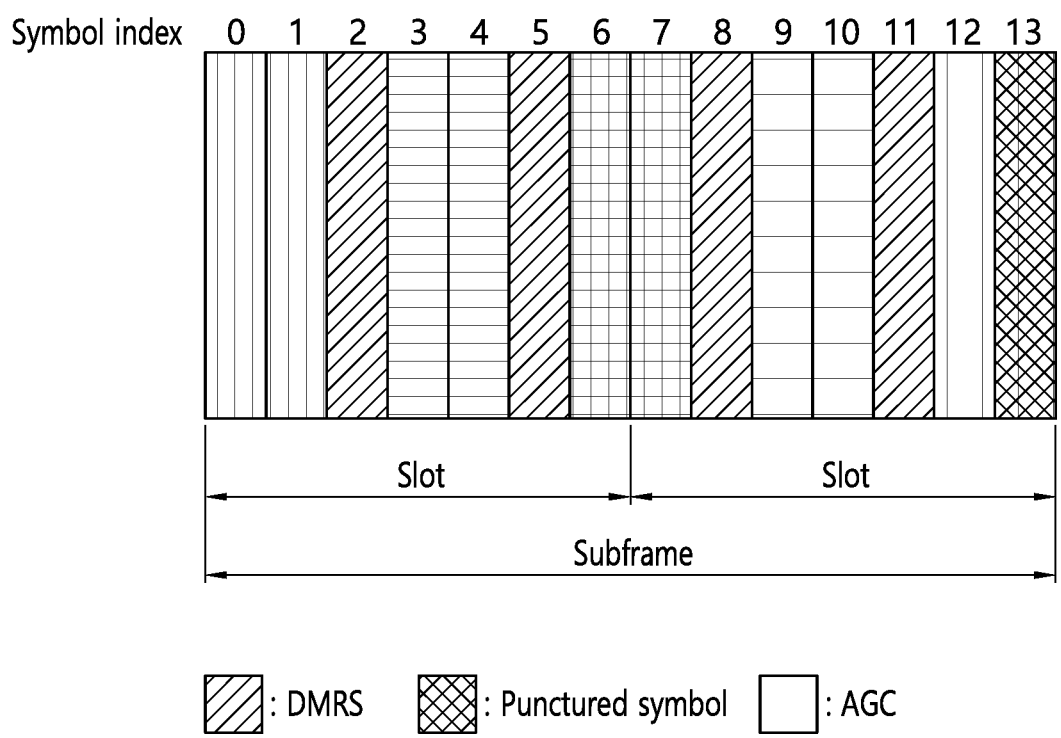
FIG. 7 illustrates an example of TXD related symbol pairing.

FIG. 7 illustrates an example of TXD related symbol pairing.

Referring to FIG. 7, TXD (e.g., STBC) related symbol pairing can be sequentially (simply) performed in ascending order of symbol index.

That is, symbols #0/1, symbols #3/4, symbols #6/7, symbols #9/10 and symbols #12/13 can be paired. It can be ascertained that a maximum number of symbol parings by which TXD gain can be obtained is "3" (i.e., symbols #3/4, symbols #6/7 and symbols #9/10) when one or both of the first symbol SYMBOL#0 and the last symbol SYMBOL#13 are not sequentially used due to "AGC" and "puncturing".

Embodiment #1-1-1

Figure 8:
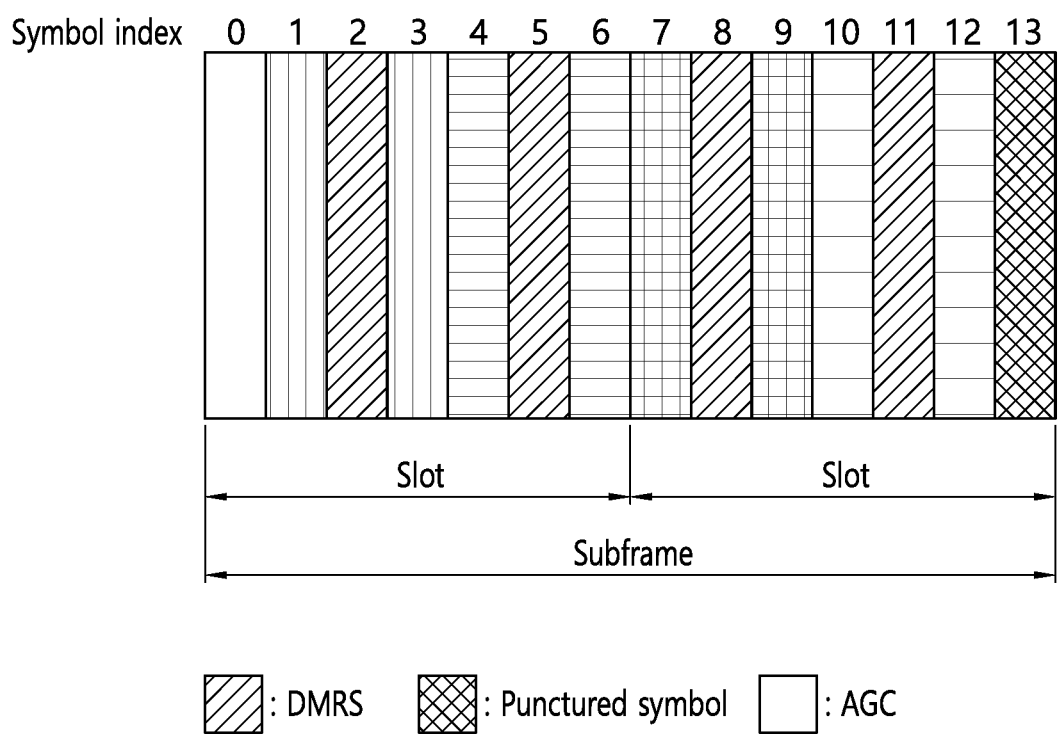
FIG. 8 illustrates another example of TXD related symbol pairing.

FIG. 8 illustrates another example of TXD related symbol pairing.

Referring to FIG. 8, in TXD (e.g., STBC) related symbol pairing, symbols #1/3, symbols #4/6, symbols #7/9 and symbols #10/12 can be paired. Here, it can be ascertained that a maximum number of symbol parings by which TXD gain can be obtained is "4". Particularly, if the paired symbols have the same (/similar) channel state, a relatively high TXD gain as compared to the case of FIG. 7 can be obtained.

Figure 9:
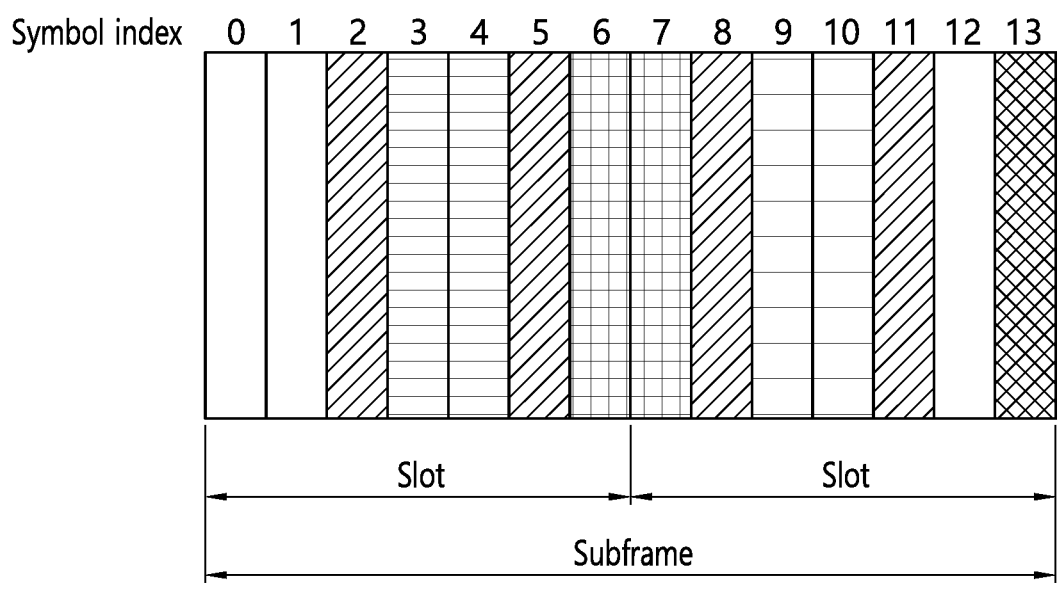
FIG. 9 illustrates another example of TXD related symbol pairing.

FIG. 9 illustrates another example of TXD related symbol pairing.

Referring to FIG. 9, "symbols #3/4", "symbols #6/7" and "symbols #9/10" can be and it can be ascertained that a maximum number of symbol parings by which TXD gain can be obtained is "3".

Figure 10:
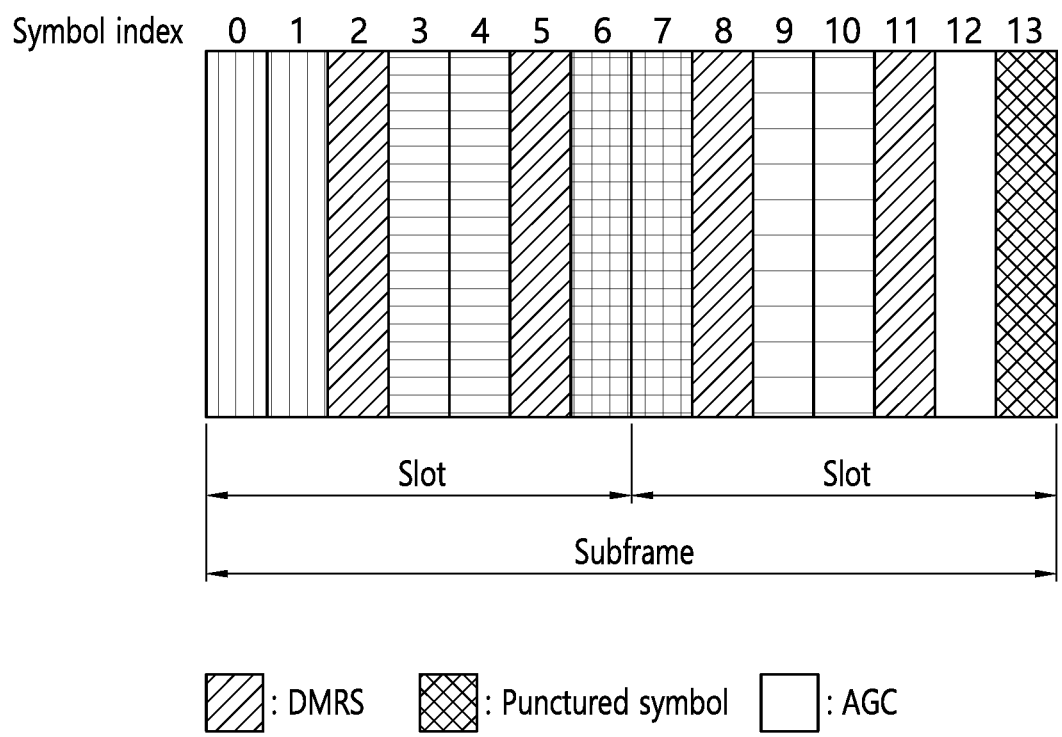
FIG. 10 illustrates another example of TXD related symbol pairing.

FIG. 10 illustrates another example of TXD related symbol pairing.

Referring to FIG. 10, "symbols #0/1", "symbols #3/4", "symbols #6/7" and "symbols #9/10" can be paired. If the entire first symbol SYMBOL#0 is not used for AGC and thus can be used for TXD related pairing, it can be ascertained that a maximum number of symbol parings by which TXD gain can be obtained is "4".

The number (unit) of paired symbols described in FIGS. 7 to 10 may be set(/signaled) differently depending on parameters such as a UE speed (because the speed affects achievement of a TXD gain as well as channel change (between symbols) of the time axis) and a congestion level of a V2X pool.

(Embodiment #1-1-2) When various TXD related symbol pairings as in the above-described embodiment #1-1-1 are applied, symbols to/on which TXD (e.g., STBC) related symbol pairing is not applied/performed (e.g., symbol #0 and symbol #13 of FIG. 8, symbol #0, symbol #1, symbol #12 and symbol #13 of FIG. 9, and symbol #12 and symbol #13 of FIG. 10) are referred to as "NP_OS". That is, NP_OS may be interpreted as a symbol by which (a part of) a specific TXD related gain cannot be obtained and/or a symbol to which a (specific) TXD method is not applied.

Modulation symbol (MS) mapping and AP index or AP count mapping may be performed(assumed) for such NP_OS according to the following rule.

For example, the same modulation symbol can be repeatedly mapped between different APs (layers) on specific NP_OS. This method can be useful, for example, when channel correlation between different APs is high. When the corresponding rule is applied, (A) a receiving end can decode (corresponding) modulation symbols by combining (/aggregating) different AP related (DM-RS) channel estimation methods on (specific) NP_OS. And/or (B) modulation symbols mapped on different NP_OSs may be different.

Alternatively, a preset(/signaled) modulation symbol on TXD related paired symbols (indexes) may be repeatedly mapped. For example, in the case of FIG. 8, a modulation symbol of symbol #1 can be repeatedly mapped on symbol #0 and a modulation symbol of symbol #12 can be repeatedly mapped on symbol #13. Further, in the case of FIG. 9, modulation symbols of symbol #3 and symbol #4 can be repeatedly mapped on symbol #0 and symbol #1 and modulation symbols of symbol #9 and symbol #10 can be repeatedly mapped on symbol #12 and symbol #13. In the case of FIG. 10, modulation symbols of symbol #9 and symbol #10 can be repeatedly mapped on symbol #12 and symbol #13.

Alternatively, the same modulation symbol can be repeatedly mapped between preset(/signaled) paired NP_OS (indexes). In this case, a "time diversity" gain can be obtained. For example, in the case of FIG. 8, symbols #0/13 are paired and the same modulation symbol can be repeatedly mapped thereon. In the case of FIG. 9, "symbols #0/13", "symbols #1/12" (and/or "symbols #0/12" and "symbols #1/13") are paired and the same modulation symbol can be repeatedly mapped thereon. In the case of FIG. 10, "symbols #12/13" is paired and the same modulation symbol can be (respectively) repeatedly mapped thereon.

Transmission on specific NP_OS can be performed with a (preset(/signaled)) less number of APs (e.g., "1") than the number of APs (indexes) (e.g., "2") on preset(/signaled) TXD related paired symbols.

On specific NP_OS, transmit power for each of a relatively small number (APN_X) of APs can be applied(/assumed) (A) as the same as transmit power for each of a relatively large number (APN_Y) of APs on TXD related paired symbols.

And/or (B) transmit power for each of a relatively small number of APs on specific NP_OS can be determined to be "V2X channel(/signal) (maximum) transmit power/APN_X" (and/or transmit power for each of (a relatively large number of) APs on (TXD related) paired symbols is increased by a ratio of "APN_Y/APN_X").

Transmission on specific NP_OS may be performed through other preset(/signaled) TXD methods (e.g., SFBC and precoding/beam cycling (which can be interpreted as a TXD method which does not require symbol pairing, for example).

A preset(/signaled) modulation symbol (of bits(/MCS)) can be mapped(/transmitted) on specific NP_OS. This modulation symbol may be used for a virtual CRS(/RS).

(Rule #2) A preset(/signaled) specific TXD (e.g., precoding(/beam) cycling) method can be implemented according to the following (some) rules. The following (some) methods may be restrictively applied only to "precoding(/beam) cycling" based TXD operation.

(Example #2-1) It is possible to allow TXD_UE to generate(/transmit) a DM-RS sequence (and/or AP (index)) through a legacy method (LTE REL-14) and sequentially change precoding(/beam)(indexes) for preset(/signaled) symbol(group) units (e.g., slots).

Here, while DM-RSs for a plurality of APs may be separately transmitted for cyclic shifts (CSs) when precoding(/beam) cycling is applied, it can be interpreted as sequential(/virtual) mapping of different APs in units of "TDMed" symbol(group) from the viewpoint of TXD_UE (and/or transmission carried out by TXD_UE on the single AP used by a legacy (LTE REL-14) UE from the viewpoint of the legacy (LTE REL-14) UE).

When the aforementioned rule is applied, a legacy (LTE REL-14) UE which shares a V2X resource pool with TXD_UE has difficulty successful decoding(/reception) of a PSSCH transmitted by TXD_UE but can effectively perform PSSCH-RSRP measurement based sensing(/resource exclusion) operation in consideration of TXD_UE.

(Example #2-2) It is possible to allow TXD_UE to generate(/transmit) a DM-RS sequence (and/or AP (index)) through a legacy method (LTE REL-14) and regard AP (and/or precoding(/beam) (index)) as being sequentially changed for preset(/signaled) symbol (group) units (e.g., slots).

When the aforementioned rule is applied, first/third DM-RSs (e.g., symbols #2/8 (refer to FIG. 6)) and second/fourth DM-RSs (e.g., symbols #5/11 (refer to FIG. 6)) can be regarded as being respectively mapped to AP#X and AP#Y from the viewpoint of TXD_UE. And/or the first/second DM-RSs (e.g., symbols #2/5 (refer to FIG. 6)) and the third/fourth DM-RSs (e.g., symbols #8/11 (refer to FIG. 6)) are regarded as being respectively mapped to AP#X and AP#Y.

The aforementioned rule may be useful when TXD operation is applied only to speeds below a preset(/signaled) threshold value (e.g., a case of relatively less channel change on the time axis).

(Example #2-3) It is possible to allow TXD_UE to sequentially map different APs (and/or precoding(/beam) (indexes)) for preset(/signaled) symbols (symbol groups). When the corresponding rule is applied, DM-RSs (DM-RS sequences) related to different APs may be simultaneously transmitted on four DM-RS symbols (refer to FIG. 6) with different cyclic shifts (CSs). When the aforementioned rule is applied, pairing between neighboring symbols may not need to be performed(/applied).

(Rule #3) In the present disclosure, (A) TXD operation may be set(/signaled) such that it is restrictively applied(/permitted) for speeds (and/or a (specific) speed range) below a preset(/signaled) threshold value, a time/frequency sink source type (e.g., a case in which a frequency (error) offset is relatively small), and CBR measurement values equal to or less than(/greater than) a preset(/signaled) threshold value. For example, in the case of a high speed, space diversity is meaningless because time-domain diversity is generated and TXD operation such as STBC is difficult to perform because channels rapidly change.

And/or (B) TXD-related paired symbol(group) units (lengths) may be differently (or independently) set(/signaled) for preset(/signaled) speeds (ranges), time/frequency sink source types, and preset(/signaled) CBR measurement values (ranges).

Information used for the aforementioned setting may be set(/signaled) "pool-specifically" and/or "carrier-specifically".

(Rule #4) When TXD transmission based on a plurality of APs including preset(/signaled) legacy (LTE REL-14) APs is performed (and/or TXD related transmission is (additionally) performed on an AP different from legacy (LTE REL-14) UEs), DM-RS (index) values and/or OCC (index) values (related to APs different from legacy (LTE REL-14) APs) may be set(/signaled) according to the following (some) rules.

For example, it is possible to allow TXD-UE to determine DM-RS CS (index) values and/or OCC (index) values on legacy (LTE REL-14) APs according to a legacy method.

A DM-RS sequence associated with a PSSCH, a PSCCH, a PSDCH and a PSBCH can be generated as follows.

$$r_{PUSCH}^{(\lambda)}(m \cdot M_{sc}^{RS} + n) = w^{(\lambda)}(m) r_{u,v}^{(\alpha_\lambda, \delta)}(n) \quad \text{[Equation 1]}$$

Here, m is 0 for a special subframe and 0 or 1 otherwise. $n=0, \ldots, M_{sc}^{RS}-1$. $M_{sc}^{RS}$ represents a reference signal length as the number of subcarriers. $\delta$ is 0 or 1. U is a sequence group number in slot $n_s$, and v is a basic sequence number. u can be determined on the basis of $n_{ID}^{RS}$ and $f_{ss}$.

$\alpha_\lambda$ is a cyclic shift value in slot $n_s$ and can be given by the following Equation.

$$\alpha_\lambda = 2\pi n_{CS,\lambda}/12 \quad \text{[Equation 2]}$$

The parameters in Equations 1 and 2 can be determined as shown in the following table in the case of a reference signal (DM-RS) for a PSSCH.

TABLE 1

| Parameter | | Sidelink transmission modes 1 and 2 | Sidelink transmission modes 3 and 4 |
|---|---|---|---|
| Group hopping | | enabled | enabled |
| | $n_{ID}^{RS}$ | $n_{ID}^{SA}$ | $n_{ID}^{X}$ |
| | $n_s$ | $n_{ss}^{PSSCH}$ | $2n_{ss}^{PSSCH}$ first DM-RS symbol in a slot $2n_{ss}^{PSSCH} + 1$ second DM-RS symbol in a slot |
| | $f_{ss}$ | $n_{ID}^{SA}$ mod 30 | $\lfloor n_{ID}^{X}/16 \rfloor$ mod 30 |
| Sequence hopping | | disabled | disabled |
| Cyclic shift | $n_{cs,\lambda}$ | $\lfloor n_{ID}^{SA}/2 \rfloor$ mod 8 | $\lfloor n_{ID}^{X}/2 \rfloor$ mod 8 |
| Orthogonal sequence | $\lfloor w^\lambda(\cdot) \rfloor$ | [+1 +1] if $n_{ID}^{SA}$ mod 2 = 0 [+1 −1] if $n_{ID}^{SA}$ mod 2 = 1 | [+1 +1 +1 +1] if $n_{ID}^{X}$ mod 2 = 0 [+1 −1 +1 −1] if $n_{ID}^{X}$ mod 2 = 1 |
| Reference signal length | $M_{sc}^{RS}$ | $M_{sc}^{PSSCH}$ | $M_{sc}^{PSSCH}$ |
| Number of layers | v | 1 | 1 |
| Number of antenna ports | P | 1 | 1 |

$n_{ID}^{RS}$ is an ID related to sequence group hopping. $n_S$ is a slot number and $f_{SS}$ represents a sequence shift pattern. $n_{ID}^{SA}$ is a sidelink group destination identity (ID).

$n_{CS,\lambda}$ is a cyclic shift value. Symbols to which DM-RSs are mapped for a PSSCH and a PSCCH in sidelink transmission modes 3 and 4 may be l=2, 5 (i.e., third and sixth symbols) in the first slot and l=1, 4 (i.e., second and fifth symbols) in the second slot.

Symbols to which DM-RSs are mapped for a PSBCH in sidelink transmission modes 3 and 4 may be l=4, 6 (i.e., fifth and seventh symbols) in the first slot and l=2 (i.e., third symbol) in the second slot.

In sidelink transmission modes 1 and 2, a pseudo-random sequence generator can be initialized at the start of each slot satisfying $n_{SS}^{PSSCH}=0$. $n_{SS}^{PSSCH}$ represents a current slot number in a subframe pool for a PSSCH. In sidelink transmission modes 3 and 3, the pseudo-random sequence generator can be initialized at the start of each slot satisfying $n_{SS}^{PSSCH}$ mod 2=0.

In sidelink transmission modes 3 and 3, a cyclic shift $n_{CS,\lambda}$ to be applied to all DM-RSs within a subframe can be randomly selected from {0, 3, 6, 9} for a PSCCH.

For sidelink transmission modes 1 and 2, m=0, 1. In sidelink transmission modes 3 and 4, m=0,1,2,3 for a PSSCH and m=0,1,2 for a PSDCH and a PSBCH.

In sidelink transmission modes 3 and 4, $n_{ID}^{X}$ is the same as decimal expression of CRC on a PSCCH transmitted in the same subframe as that for a PSSCH and can be given as represented by the following Equation.

$$n_{ID}^{X} \Sigma_{i=0}^{L-1} p_i \cdot 2^{L-1-i} \quad \text{[Equation 3]}$$

In the above Equation, p represents a parity bit and L denotes the number of parity bits.

$M_{SC}^{PSSCH}$ represents a band scheduled for PSSCH transmission as the number of subcarriers.

The parameters in Equations 1 and 2 can be determined as shown in the following table in the case of a reference signal for a PSCCH.

TABLE 2

| Parameter | | Sidelink transmission modes 1 and 2 | Sidelink transmission modes 3 and 4 |
|---|---|---|---|
| Group hopping | | disabled | disabled |
| | $n_{ID}^{RS}$ | — | — |
| | $n_s$ | | |
| | $f_{ss}$ | 0 | 8 |
| Sequence hopping | | disabled | disabled |
| Cyclic shift | $n_{cs,\lambda}$ | 0 | {0, 3, 6, 9} |
| Orthogonal sequence | $\lfloor w^\lambda(\cdot) \rfloor$ | [+1 +1] | [+1 +1 +1 +1] |
| Reference signal length | $M_{sc}^{RS}$ | $M_{sc}^{PSCCH}$ | $M_{sc}^{PSCCH}$ |
| Number of layers | v | 1 | 1 |
| Number of antenna ports | P | 1 | 1 |

$M_{SC}^{PSCCH}$ represents a band for PSCCH transmission as the number of subcarriers.

The parameters in Equations 1 and 2 can be determined as shown in the following table in the case of reference signals for a PSDCH and a PSBCH.

TABLE 3

| Parameter | | PSDCH | PSBCH Sidelink transmission modes 1 and 2 | Sidelink transmission modes 3 and 4 |
|---|---|---|---|---|
| Group hopping | | disabled | disabled | disabled |
| | $f_{ss}$ | 0 | $\lfloor N_{ID}^{SL}/16 \rfloor$ mod 30 | $\lfloor N_{ID}^{SL}/16 \rfloor$ mod 30 |
| Sequence hopping | | disabled | disabled | disabled |
| Cyclic shift | $n_{cs,\lambda}$ | 0 | $\lfloor N_{ID}^{SL}/2 \rfloor$ mod 8 | $\lfloor N_{ID}^{SA}/2 \rfloor$ mod 8 |
| (Orthogonal) sequence | $[\ldots w^\lambda(m) \ldots]$ | [+1 +1] | [+1 +1] if $N_{ID}^{SL}$ mod 2 = 0 [+1 −1] if $N_{ID}^{SL}$ mod 2 = 1 | [+1 +1 +1 +1] if $N_{ID}^{SL}$ mod 2 = 0 [+1 −1 +1 −1] if $N_{ID}^{SL}$ mod 2 = 1 |
| Reference signal length | $M_{sc}^{RS}$ | $M_{sc}^{PSSCH}$ | $M_{sc}^{PSSCH}$ | $M_{sc}^{PSSCH}$ |
| Number of layers | v | 1 | 1 | 1 |
| Number of antenna ports | p | 1 | 1 | 1 |

$M_{SC}^{PSDCH}$ represents a band for PSDCH transmission as the number of subcarriers. $M_{SC}^{PSBCH}$ represents a band for PSBCH transmission as the number of subcarriers. $N_{ID}^{SL}$ represents a physical layer sidelink synchronization ID.

Figure 11:
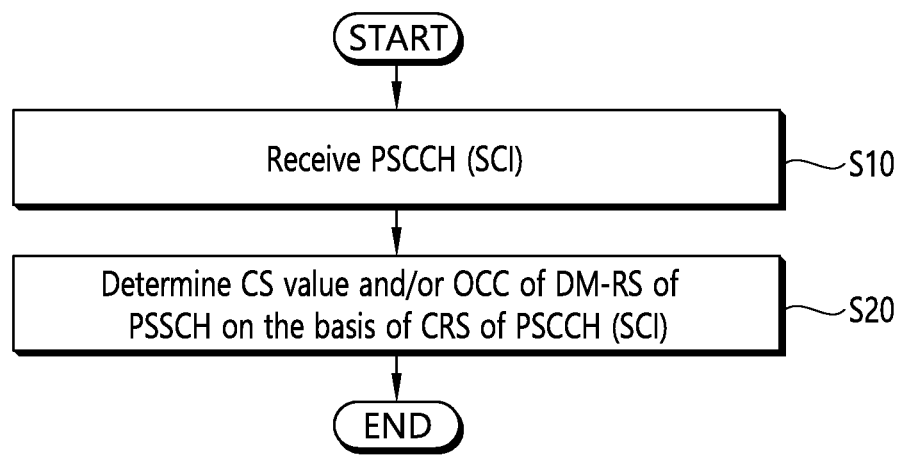
FIG. 11 illustrates a method for determining a cyclic shift (CS) value and/or an orthogonal cover code (OCC) of a DM-RS of a PSSCH in conventional V2X communication.

FIG. 11 illustrates a method for determining a cyclic shift (CS) value and/or an orthogonal cover code (OCC) of a DM-RS of a PSSCH in conventional V2X communication.

Referring to FIG. 11, a UE receives a PSCCH (SCI) (S10).

The UE determines a CS value (or CS index, the same applies to the following description) and/or an OCC (or OCC index, the same applies to the following description) of a DM-RS of a PSSCH on the basis of cyclic redundancy check (CRC) of the PSCCH (SCI) (S20). That is, in conventional methods in which TXD is not applied to V2X transmission, CRC of SCI transmitted through a PSCCH is used to determine a CS value (and/or an OCC) of a DM-RS used to decode data transmitted through a PSSCH.

On the other hand, in future wireless communication systems to which the present disclosure is applied, TXD can be applied to V2X transmission, and in this case, data can be transmitted through a plurality of antenna ports and a CS value (and/or an OCC) of a DM-RS for each of the plurality of antenna ports needs to be signaled (to a receiving end through signaling or a predefined rule).

Examples below are solutions for the aforementioned necessity.

(Example #4-1) A DM-RS CS (index) value and/or an OCC (index) value related to an AP different from legacy (LTE REL-14) APs, and/or an offset value with respect to a CS (index) value and/or an offset value with respect to an OCC (index) value used for a DM-RS on legacy (LTE REL-14) APs can be signaled over a defined (as a corresponding usage) field(/bit) on the legacy (LTE REL-14) PSCCH.

The corresponding field (bit) may be (A) a "reserved bit(/field)" or (B) "retransmission index field" or "frequency resource location of initial transmission and retransmission field)" when (single transport block related) retransmission is not performed on the legacy (LTE REL-14) PSCCH. The frequency resource location of initial transmission and retransmission field may be defined as a plurality of code points that can equally indicate the number of subchannels used for initial transmission.

Figure 12:
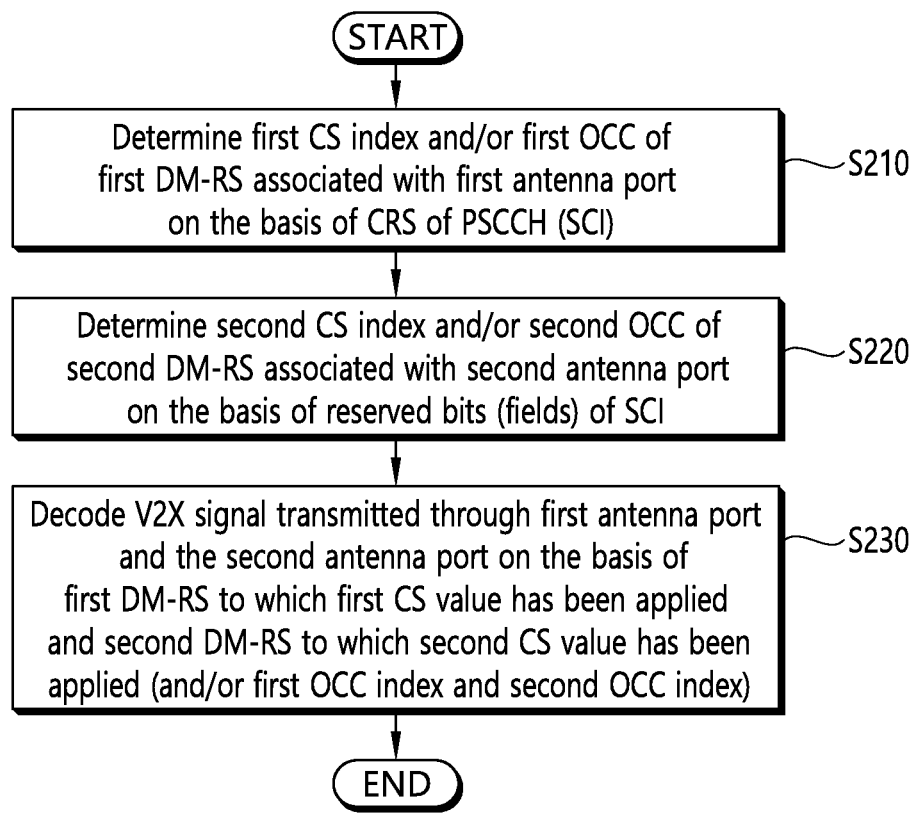
FIG. 12 illustrates a V2X signal decoding method of a UE according to example #4-1. The V2X signal is assumed to be a signal transmitted (e.g., TXDed) through first and second antenna ports.

FIG. 12 illustrates a V2X signal decoding method of a UE according to example #4-1. The V2X signal is assumed to be a signal transmitted (e.g., TXDed) through first and second antenna ports.

Referring to FIG. 12, the UE determines a first CS index and/or a first OCC index of a first DM-RS associated with the first antenna port on the basis of CRC of a PSCCH (SCI) (S210).

For example, the SCI can include 1) priority: 3 bits, 2) a resource reservation period: 4 bits, 3) a modulation and coding scheme (MCS): 5 bits, 4) CRC: 16 bits, 5) a retransmission index (RETX_INDEX): 1 bit, 6) a time gap between transmission start and retransmission (TGAP_INI-RETX): 4 bits, 7) frequency resource positions of transmission start and retransmission: (a maximum of) 8 bits, and 8) reserved bits: (a maximum of) 7 bits.

Here, the UE can determine the first CD index and/or the first OCC index of the first DM-RS associated with the first antenna port on the basis on the basis of the CRC bits. Here, the first antenna port may be an antenna port commonly used for legacy UEs (e.g., UEs which perform transmission using one antenna port) and advanced UEs (e.g., UEs which perform transmission (e.g., TXD) using a plurality of antenna ports). The aforementioned UE may be an advanced UE.

The UE determines a second CS index and/or a second OCC index of a second DM-RS associated with the second antenna port on the basis of reserved bits of the SCI (S220). The second antenna port may be an antenna port used only for advanced UEs.

The UE decodes the V2X signal transmitted through the first and second antenna ports on the basis of the first DM-RS to which the first CD index value and/or the first OCC index value have been applied and the second DM-RS to which the second CD index value and/or the second OCC index value have been applied (S230). The V2X signal may be a signal to which (TXD related) block coding, precoding cycling and the like have been applied in units of two consecutive paired symbols (other than reference signal symbols) in the time domain in a subframe including a plurality of symbols. The first symbol and the last symbol of the subframe may not be included in the two consecutive symbols.

Figure 13:
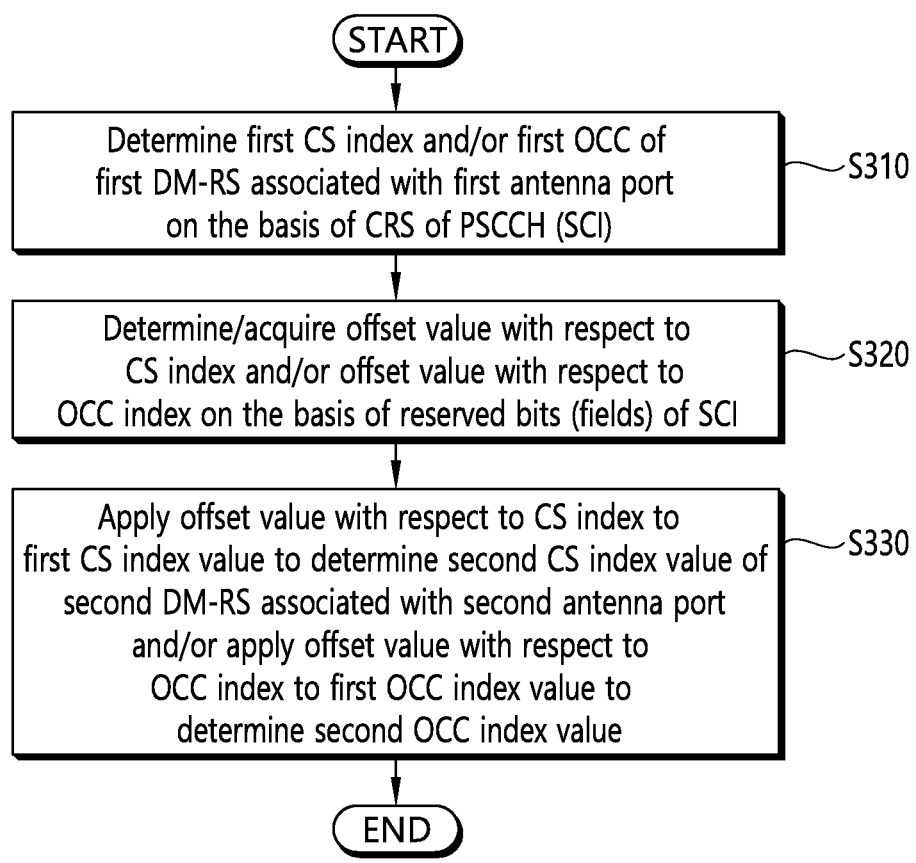
FIG. 13 illustrates a more specific example to which the method described in FIG. 12 is applied.

FIG. 13 illustrates a more specific example to which the method described in FIG. 12 is applied.

Referring to FIG. 13, the UE determines the first CS index value and/or the first OCC index value of the first DM-RS associated with the first antenna port on the basis of the CRC of the PSCCH (SCI) (S310).

The UE determines/acquires an offset value with respect to the CS index and/or an offset value with respect to the OCC index through reserved bits (fields) of the SCI (S320). For example, the offset value with respect to the CS index may be an offset value that needs to be added to the first CS index value. That is, the offset value with respect to the CS index may be provided as a difference between the second CS index value and the first CS index value.

Here, the second CS index value of the second DM-RS associated with the second antenna port can be determined by applying the offset value with respect to the CS index to the first CS index value. And/or the second OCC index value can be determined by applying the offset value with respect to the OCC index to the first OCC index value (S330).

(Example #4-2) A DM-RS CS (index) value and/or an OCC (index) value related to an AP different from legacy (LTE REL-14) APs, and/or an offset value with respect to a CS (index) value and/or an offset value with respect to an OCC (index) value used for a DM-RS on legacy (LTE REL-14) APs can be determined(/signaled) through preset (/signaled) bits (e.g., some of first to seventh CRC bits that are not used in a legacy system (LTE REL-14)) from among PSCCH related CRC bits.

(Example #4-3) An offset value for each AP different from legacy (LTE REL-14) APs, which is set(/signaled) in advance by a network, may be added to a DM-RS CS (index) value and/or an OCC (index) value on legacy (LTE REL-14) APs, which are determined according to a legacy method, and then a DM-RS CS (index) value and/or an OCC (index) value related to an AP different from legacy (LTE REL-14) APs may be finally (respectively determined (and/or a DM-RS CS (index) value and/or an OCC (index) value for each AP different from legacy (LTE REL-14) APs may be (respectively) set(/signaled) in advance by the network).

Examples of the above-described proposed methods can be included as one of methods implemented by the present disclosure and thus can be regarded as proposed methods. Further, while the above-described proposed methods can be independently implemented, some of the proposed methods may be combined (or aggregated).

Although the proposed methods have been described based on 3GPP LTE for convenience of description in the present disclosure, the range of the system to which the proposed methods are applied can be extended to systems other than 3GPP LTE. For example, the proposed methods of the present disclosure can be extended and applied to D2D communication. Here, D2D communication refers to direct communication of a UE with another UE using a radio channel. Although a UE refers to a user terminal, when network equipment such as a base station transmits/receives signals according to communication between UEs, the network equipment may be regarded as a kind of UE.

Further, the proposed methods of the present disclosure may be restrictively applied to mode-3 V2X operation (and/or mode-4 V2X operation).

Further, the proposed methods of the present disclosure may be restrictively applied to V2X message transmission based on a specific TXD method (e.g., STBC or precoding/beam cycling).

Further, the proposed methods of the present disclosure may be restrictively applied to transmission of a preset(/signaled) (specific) V2X channel(/signal) (e.g., a PSSCH (and/or an (associated) PSCCH and/or PSBCH).

Further, for example, the proposed methods of the present disclosure may be restrictively applied to a case in which a PSSCH and a PSCCH (associated therewith) are transmitted in an adjacent (or non-adjacent) manner in the frequency domain and/or a case in which transmission based on a preset(/signaled) MCS (and/or a coding rate and/or an RB) (value(/range)) is performed.

Figure 14:
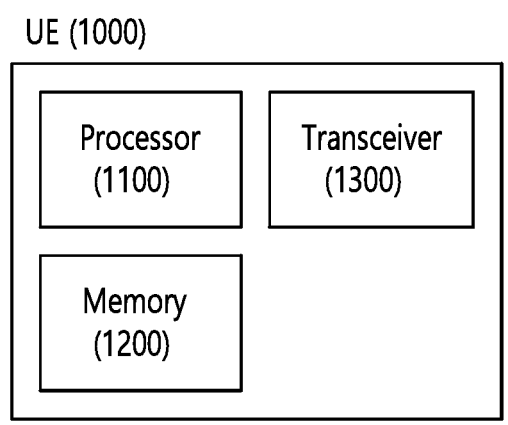
FIG. 14 is a block diagram illustrating an apparatus in which an embodiment of the present disclosure is implemented.

FIG. 14 is a block diagram illustrating an apparatus in which an embodiment of the present disclosure is implemented.

Referring to FIG. 14 an apparatus 1000 includes a processor 1100, a memory 1200 and a transceiver 1300. The processor 1100 implements the proposed functions, procedures and/or methods. The apparatus 1000 may be a UE or an eNodeB. The transceiver 1300 is connected to the processor 1100 and transmits and receives RF signals. The memory 1200 can store information necessary for operation of the processor 1100 and also store transmitted and received signals.

Figure 15:
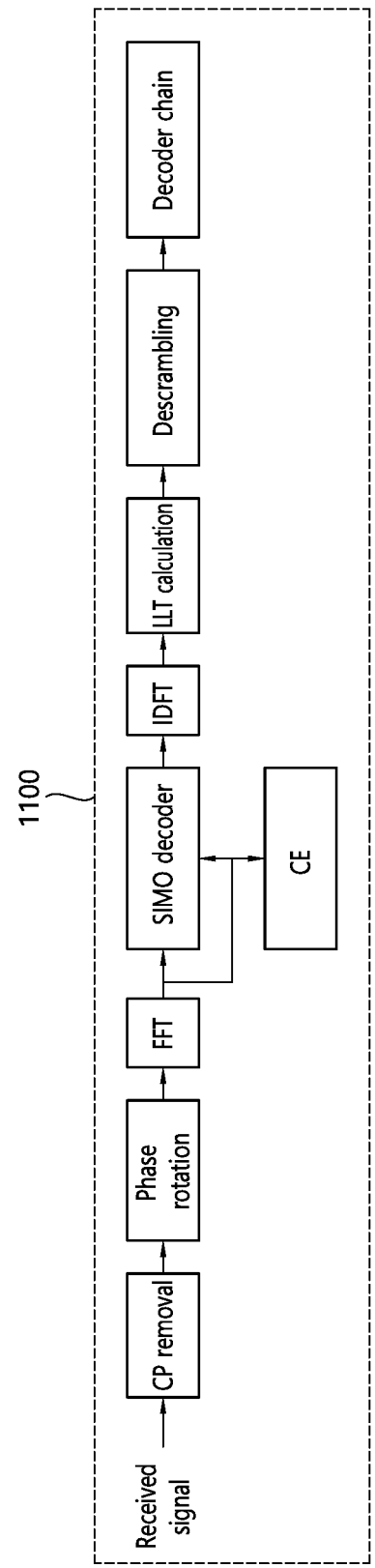
FIG. 15 illustrates an example of a configuration of the processor 1100.

FIG. 15 illustrates an example of a configuration of the processor 1100.

Referring to FIG. 15, the processor 1100 may include a CP removal module for removing a cyclic prefix (CP) from a received signal, a phase rotation module for rotating a phase, a fast Fourier transform (FFT) module, a channel estimation (CE) module, a single input multiple output (SIMO) decoder, an inverse discrete Fourier transform (IDFT) module, a log-likelihood ratio (LLR) calculation module, a de-scrambling module, a decoder chain, etc.

The processor may include an application-specific integrated circuit (ASIC), other chipsets, logic circuits and/or a data processing device. A memory may include a read-only memory (ROM), a random access memory (RAM), a flash memory, a memory card, a storage medium and/or other storage devices. An RF unit may include a baseband circuit for processing RF signals. When embodiments are implemented by software, the above-described methods may be implemented as modules (processes, functions, and the like) performing the above-described functions. Modules may be stored in the memory and executed by the processor. The memory may be provided inside or outside the processor and connected to the processor through various known means.

What is claimed is:

1. A method for decoding a Vehicle-to-Everything (V2X) signal transmitted by means of a transmit diversity scheme in a wireless communication system, the method comprising:

determining a first cyclic shift (CS) value of a first demodulation reference signal (DM-RS) associated with a first antenna port based on a cyclic redundancy check (CRC) of sidelink control information (SCI) received through a physical sidelink control channel (PSCCH);

determining a second CS value of a second DM-RS associated with a second antenna port based on reserved bits of the SCI; and decoding the V2X signal transmitted through the first antenna port and the second antenna port based on the first DM-RS to which the first CS value has been applied and the second DM-RS to which the second CS value has been applied.

2. The method of claim 1, wherein the first DM-RS is determined based on the first CS value and the second DM-RS is determined based on the second CS value.

3. The method of claim 1, wherein the reserved bits of the SCI includes an offset value with respect to a cyclic shift (CS), and the second CS value is determined by applying the offset value with respect to the CS to the first CS value.

4. The method of claim 1, wherein the first antenna port is an antenna port used for both legacy-UEs and advanced-UEs, and the second antenna port is an antenna port used only for the advanced UEs.

5. The method of claim 1, wherein the V2X signal is received in two consecutive symbols in a subframe including a plurality of symbols in the time domain.

6. The method of claim 5, wherein the last symbol of the subframe is not used to receive the V2X signal.

7. The method of claim 1, wherein the first CS value and the second CS value are indexes indicating cyclic shift values.

8. The method of claim 1, wherein the V2X signal is received in units of two symbols from among symbols other than symbols used to receive a reference signal in a subframe including a plurality of symbols.

9. The method of claim 8, wherein, when the subframe includes 14 symbols, the units of two symbols include second and fourth symbols, fifth and seventh symbols, eighth and tenth symbols, and eleventh and thirteenth symbol.

10. The method of claim 8, wherein, when the subframe includes 14 symbols, the units of two symbols include fourth and fifth symbols, seventh and eighth symbols, tenth and eleventh symbol.

11. The method of claim 8, wherein, when the subframe includes 14 symbols, the symbols used to receive a reference signal are third, sixth, ninth and twelfth symbols.

12. A user equipment (UE) comprising:

a transceiver configured to transmit and receive radio frequency (RF) signals; and a processor operating in connection with the transceiver, wherein the processor is configured to:

determine a first cyclic shift (CS) value of a first demodulation reference signal (DM-RS) associated with a first antenna port based on a cyclic redundancy check (CRC) of sidelink control information (SCI) received through a physical sidelink control channel (PSCCH);

determine a second CS value of a second DM-RS associated with a second antenna port based on reserved bits of the SCI; and decode a Vehicle-to-Everything (V2X) signal transmitted through the first antenna port and the second antenna port based on the first DM-RS to which the first CS value has been applied and the second DM-RS to which the second CS value has been applied.

* * * * *